United States Patent
Johnson et al.

(10) Patent No.: US 10,521,622 B2
(45) Date of Patent: Dec. 31, 2019

(54) TEST CARD FOR AUTOMATED RETAIL FINANCIAL TRANSACTION SYSTEM

(71) Applicant: Walmart Apollo, LLC, Bentonville, AR (US)

(72) Inventors: Christopher D. Johnson, Bentonville, AR (US); Michael A. Ryan, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/198,289

(22) Filed: Nov. 21, 2018

(65) Prior Publication Data

US 2019/0156072 A1  May 23, 2019

Related U.S. Application Data

(60) Provisional application No. 62/590,009, filed on Nov. 22, 2017.

(51) Int. Cl.
*G06K 7/00* (2006.01)
*G07F 7/10* (2006.01)
(Continued)

(52) U.S. Cl.
CPC .............. *G06K 7/0095* (2013.01); *G06K 7/10* (2013.01); *G06Q 20/204* (2013.01); *G07F 7/0806* (2013.01)

(58) Field of Classification Search
CPC ... G06K 7/0095; G07F 7/0806; G06Q 20/204
(Continued)

(56) References Cited

U.S. PATENT DOCUMENTS 3,852,815 A * 12/1974 Ljudmirsky ............. G11B 5/56
                                                            360/75
5,438,186 A   8/1995 Nair
(Continued)

FOREIGN PATENT DOCUMENTS

| CN | 103679970 | 3/2014 |
|----|-----------|--------|
| CN | 105321269 | 2/2016 |

(Continued)

OTHER PUBLICATIONS

"Free Online Barcode Generator: Create Barcodes for Free!"; http://barcode.tecit.com/en; printed Apr. 28, 2016; pp. 1-2.
(Continued)

*Primary Examiner* — Toan C Ly
(74) *Attorney, Agent, or Firm* — Fitch, Even, Tabin & Flannery LLP

(57) ABSTRACT

In some embodiments, apparatuses and methods are provided herein useful to a test card for use in automated testing of a POS terminal. In some embodiments, the test card comprises a substrate including at least one track, wherein the substrate is configured to interact with a magnetic card reader, an electrical contact configured to receive magnetic stripe data from a database, and an electrical trace, wherein the electrical trace is programmable with respect to the received magnetic stripe data, wherein the electrical trace forms a continuous conductive pathway, wherein the electrical trace forms a stair step configuration comprising a plurality of linear segments including a first set of linear segments and a second set of linear segments, wherein the second set of linear segments includes at least one segment, and wherein the at least one segment connects ones of the first set of linear segments.

20 Claims, 4 Drawing Sheets

(51) Int. Cl.
*G06Q 20/20* (2012.01)
*G06K 7/10* (2006.01)
*G07F 7/08* (2006.01)

(58) Field of Classification Search
USPC .......................................................... 235/383
See application file for complete search history.

(56) References Cited

U.S. PATENT DOCUMENTS

| | | |
|---|---|---|
| 5,577,197 A | 11/1996 | Beck |
| 5,760,383 A | 6/1998 | Heske, III |
| 6,719,199 B1 | 4/2004 | Cotten |
| 6,785,845 B2 | 8/2004 | Venkataraman |
| 6,793,141 B1 | 9/2004 | Graham |
| 6,978,930 B2 | 12/2005 | Harding |
| 7,613,634 B2 | 11/2009 | Siegel |
| 8,132,713 B2 | 3/2012 | Kekicheff et al. |
| 8,329,051 B2 | 12/2012 | Fu |
| 8,376,239 B1 * | 2/2013 | Humphrey ............ G06K 7/084 235/493 |
| 8,453,931 B2 | 6/2013 | Chiou |
| 8,824,083 B1 * | 9/2014 | Kientz ................... G11B 5/584 360/55 |
| 8,955,752 B2 | 2/2015 | Chiou |
| 9,569,765 B2 | 2/2017 | Cancro |
| 2001/0034623 A1 | 10/2001 | Chung |
| 2002/0092914 A1 | 7/2002 | Pentz |
| 2004/0060984 A1 | 4/2004 | Connelly |
| 2005/0127173 A1 | 6/2005 | Idol, Jr. |
| 2005/0274801 A1 | 12/2005 | Harding |
| 2007/0284449 A1 | 12/2007 | Yuen |
| 2008/0105749 A1 | 5/2008 | Lei |
| 2016/0034723 A1 | 2/2016 | Somani |

FOREIGN PATENT DOCUMENTS

| | | |
|---|---|---|
| CN | 206311714 | 7/2017 |
| JP | H02297721 A | 12/1990 |
| WO | 1999028851 | 6/1999 |
| WO | 2014056118 | 4/2014 |

OTHER PUBLICATIONS

Abrantix AG; "EFTPOS Card and PIN Robot for Automated Testing"; https://www.youtube.com/watch?v=SAwMnx8Vdb8; published Mar. 21, 2016; pp. 1-6.
Demaitre, Eugene; "POS Testing Goes Robotic With Rhiscom Automaton"; Robotic Business Review; published Apr. 28, 2016; pp. 1-6.
Grupohdi; "Testing POS Using Robotics"; https://www.youtube.com/watch? v=2RCD064ZuJ8; published Apr. 3, 2013; pp. 1-4.
PCT; App. No. PCT/US17/67499; International Search Report and Written Opinion dated Mar. 8, 2018.
PCT; App. No. PCT/US2018/061413; International Search Report dated Jan. 25, 2019.
UL Transaction Security; "UL Terminal Test Station"; https://www.youtube.com/watch?v=23a9iavWH3o; published on Sep. 2, 2016; pp. 1-5.

* cited by examiner

TEST CARD FOR AUTOMATED RETAIL FINANCIAL TRANSACTION SYSTEM

CROSS-REFERENCE TO RELATED APPLICATION

This application claims the benefit of U.S. Provisional Application No. 62/590,009, filed Nov. 22, 2017, which is incorporated by reference in its entirety herein.

TECHNICAL FIELD

This invention relates generally to automated testing systems and, more particularly, to automated testing systems for point-of-sale (POS) terminals.

BACKGROUND

Point-of-sale (POS) terminals are complex systems that can include multiple hardware peripherals and software applications. For example, a POS terminal may include a primary computer coupled to a display device, a stationary scanning mechanism, a handheld scanner, a card reader, and a printer, as well as multiple backend systems. Each of these hardware peripherals, as well as the software employed by the hardware peripherals, may be provided by different entities. Consequently, it can be difficult to ensure that the POS terminal will work seamlessly, with few or no errors.

One hardware peripheral that can be difficult to test is a magnetic card reader. Magnetic card readers include read heads positioned within a channel. The read heads detect, and read information from, magnetic stripes on cards, such as credit cards, debit cards, gift cards, and the like. The positioning of the read heads within the channel can vary from manufacturer to manufacturer, and also within magnetic card readers produced by a single manufacturer based on manufacturing tolerances. If the height of the read heads within the channel does not align with the positioning of the magnetic stripe on the card, the magnetic card reader may have difficulty reading the magnetic stripe. In the event of a misread or a failed read during a real (i.e., "live") transaction, a customer can swipe his or her card again. Because a human is swiping the card in a real transaction, it is unlikely that the card will be swiped in exactly the same manner that resulted in the misread or failed read, and the magnetic card reader is likely to eventually read the card. Unfortunately, in an automated testing environment, the card will likely be swiped in the same manner every time. Because of this consistency with an automated system, a misread or failed read is unlikely to be corrected with subsequent swipes. Consequently, a need exists for a system that can compensate for variances in read head position of magnetic card readers for automated testing systems.

BRIEF DESCRIPTION OF THE DRAWINGS

Disclosed herein are embodiments of systems, apparatuses, and methods pertaining to a test card for use in automated testing of a point-of-sale (POS) terminal. This description includes drawings, wherein.

Figure 1:
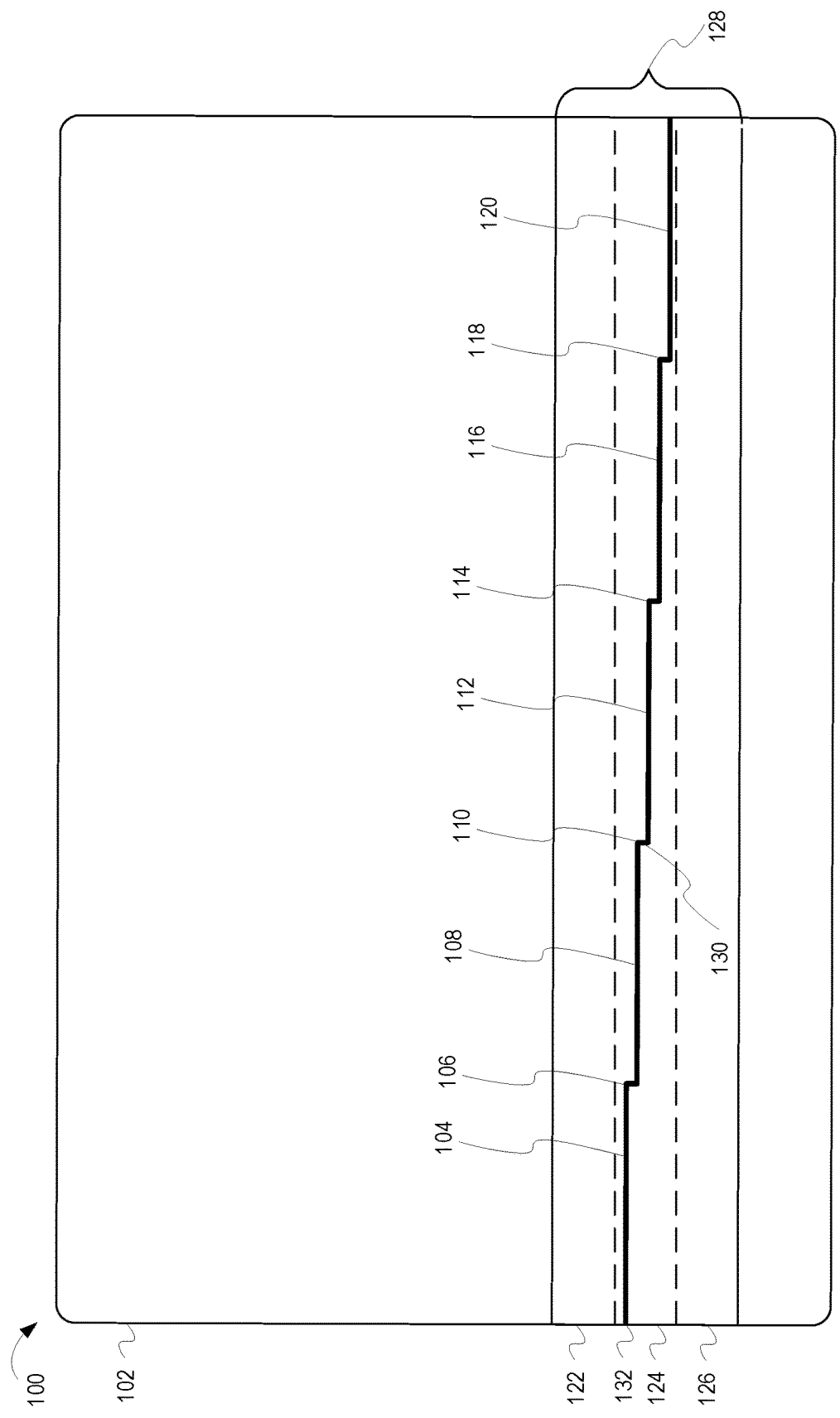
FIG. 1 depicts a test card 100 including an electrical trace 130 forming a stair step configuration, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses, and methods are provided herein useful to a test card for use in automated testing of a point-of-sale (POS) terminal. In some embodiments, the test card comprises a substrate, wherein the substrate includes at least one track, and wherein the substrate is configured to interact with a magnetic card reader, an electrical contact, wherein the electrical contact is configured to receive magnetic stripe data from a database, and an electrical trace, wherein the electrical trace is programmable with respect to the received magnetic stripe data, wherein the electrical trace is positioned within the at least one track and forms a continuous conductive pathway, wherein the electrical trace forms a stair step configuration comprising a plurality of linear segments, wherein the plurality of linear segments includes a first set of linear segments and a second set of linear segments, wherein the second set of linear segments includes at least one segment, and wherein the at least one segment connects ones of the first set of linear segments.

As previously discussed, point-of-sale (POS) terminals are a piece of a complex system used for retail transactions. The system as a whole may comprise the POS terminal as well as many other peripheral devices, such as scanner, printers, display devices, card readers, etc. Because customers expect the checkout procedure to be quick and simple, it is important to test POS terminals, as well as the system as a whole, before use in a retail environment. Testing the POS terminals before use in the retail environment can help eliminate errors during use. Because these errors can result in delays and long lines, minimizing the occurrence of errors is important for customer satisfaction and retailer profits.

While testing POS terminals and associated systems has many benefits, it can also be quite costly and time consuming. Specifically, ensuring that a card reader (e.g., a magnetic card reader) is properly reading cards and transmitting data based on the card reads to a POS terminal requires a significant expenditure of time and labor. Additionally, the interaction between the card reader and the POS terminal must be verified. One significant problem with automated testing of magnetic card readers is variation in the positioning of read heads within the channel of a magnetic card reader. The height of the read heads can vary from manufacturer to manufacturer, as well between magnetic card readers produced by a single manufacturer due to manufacturing tolerances. If a read head is not positioned in a manner which allows it to read the magnetic stripe, the read head may erroneously read the magnetic stripe or simply fail to read the magnetic stripe. This is problematic in automated systems due to the consistency with which cards are swiped. For example, if the cards are swiped robotically, the same erroneous or failed read will likely persist. Additionally, in test systems in which the card is stationary with respect to the magnetic card reader during the swipe, the same erroneous or failed read will likely persist. The systems, methods, and apparatuses described herein can be used with automated testing systems, such as those described in U.S. Patent Application No. 62/438,506 titled "Retail Financial System Testing Systems and Methods, filed Dec. 23, 2016 incorporated herein by reference.

Embodiments of the inventive subject matter described herein seek to minimize, and possibly eliminate, these problems with a specialized test card. While a standard magnetic stripe card has linear magnetic stripes, embodiments of the test card described herein include non-linear electrical traces in lieu of the linear magnetic stripes. The non-linear electrical traces are programmed with data for a card and the test card is used to interact with a magnetic card reader. In one particular embodiment, the electrical trace forms a stair step configuration (as depicted in, and described in more detail with respect to, FIGS. 1 and 2). This stair step configuration allows for compensation for variations in read head height of magnetic card readers. The discussion of FIG. 1 provides an overview of such a test card.

FIG. 1 depicts a test card 100 including an electrical trace 130 forming a stair step configuration, according to some embodiments. Much like a standard magnetic stripe card (as defined by ISO/IEC Standard 7813 and 7811), the test card 100 comprises a substrate 102 including a magnetic stripe area 128. In some embodiments, the substrate is a printed circuit board (PCB). Additionally, in some embodiments, the substrate is substantially similar in size to a standard credit card, as described in the aforementioned standards.

Again, much like a standard magnetic stripe card, the test card's 100 magnetic stripe area 128 includes three tracks: a first track 126, a second track 124, and a third track 122. However, unlike a magnetic stripe card, the test card 100 can include an electrical trace 130 in one or more of the three tracks. The example test card 100 of FIG. 1 depicts the electrical trace 130 as residing in the second track 124. The electrical trace 130 is programmable with respect to received magnetic stripe data. That is, the electrical trace 130 can be programmed with magnetic stripe data to emulate any type of magnetic stripe card (e.g., a credit card, debit card, gift card, etc.). The magnetic stripe data is stored in a database and transmitted to the test card 100. The magnetic stripe data is chosen based on a test case to execute. For example, if the test case to execute is for a credit card issued by Bank A, the electrical trace 130 will be programmed with magnetic stripe data for a credit card issued by Bank A. The test card 100 can also be used in stationary testing environments in which the magnetic stripe data is pulsed to the electrical trace 130 to simulate a swipe, as well as with systems that physically move the test card 100 with respect to the magnetic card reader to perform a swipe.

As depicted in FIG. 1, the electrical trace 130 forms a stair step configuration. That is, the electrical trace 130 includes a plurality of linear segments. The linear segments form two groups: a first group and a second group. Each linear segment of the first group is substantially parallel to one another and each linear segment of the second group is substantially parallel to one another. The linear segments of the second group connect ones of the linear segments of the first group. In the example test card 100 depicted in FIG. 1, the first group of linear segments includes five horizontal linear segments: a first horizontal linear segment 104, a second horizontal linear segment 108, a third horizontal linear segment 112, a fourth horizontal linear segment 116, and a fifth horizontal linear segment 120. Additionally, in the example test card 100 depicted in FIG. 1, the second group of linear segments includes four vertical linear segments: a first vertical linear segment 106, a second vertical linear segment 110, a third vertical linear segment 114, and a fourth vertical linear segment 118. Although referred to, and depicted in FIG. 1, as "vertical" linear segments and "horizontal" linear segments, such positioning with respect to boundaries (i.e., edges) of the test card 100 are not required. For example, the vertical linear segments need not be parallel to a vertical boundary of the test card 100. Likewise, the horizontal linear segments need not be parallel to a horizontal boundary of the test card 100. Additionally, it is not required that ones of the vertical linear segments and ones of the horizontal linear segments be normal to one another. Likewise, it is not required that each of the horizontal linear segments be parallel to others of the horizontal linear segments and that each of the vertical linear segments be parallel to others of the horizontal linear segments. Additionally, it is not required that the linear segments are in fact linear. Rather the linear segments can be curved, if so desired.

The horizontal linear segments and the vertical linear segments are connected in such a manner as to form a continuous conductive pathway. As depicted in the example test card 100 of FIG. 1, the vertical linear segments connect ones of the horizontal linear segments. Specifically, the first vertical linear segment 106 connects the first horizontal linear segment 104 and the second horizontal linear segment 108, the second vertical linear segment 110 connects the second horizontal linear segment 108 and the third horizontal linear segment 112, the third vertical linear segment 114 connects the third horizontal linear segment 112 and the fourth horizontal linear segment 116, and the fourth vertical linear segment 118 connects the fourth horizontal linear segment 116 and the fifth horizontal linear segment 120. In this manner, the horizontal and linear segments render the electrical trace 130 a continuous conductive pathway.

Due to the stair step configuration, the electrical trace 130 can provide the magnetic stripe data at different positions relative to the boundaries of the test card 100. Accordingly, the electrical trace 130 allows the test card 100 to compensate for variations in read head height of magnetic card readers. Such a test card 100 can be used for automated testing of retail financial transactions, whether "live" transactions (i.e., transaction involving actual payment) or test transactions (i.e., transactions that do not involve actual payment). When used to test retail financial transactions, the test card 100 can be attached to an automated testing system that interacts with a magnetic card reader via the test card 100.

Figure 2:
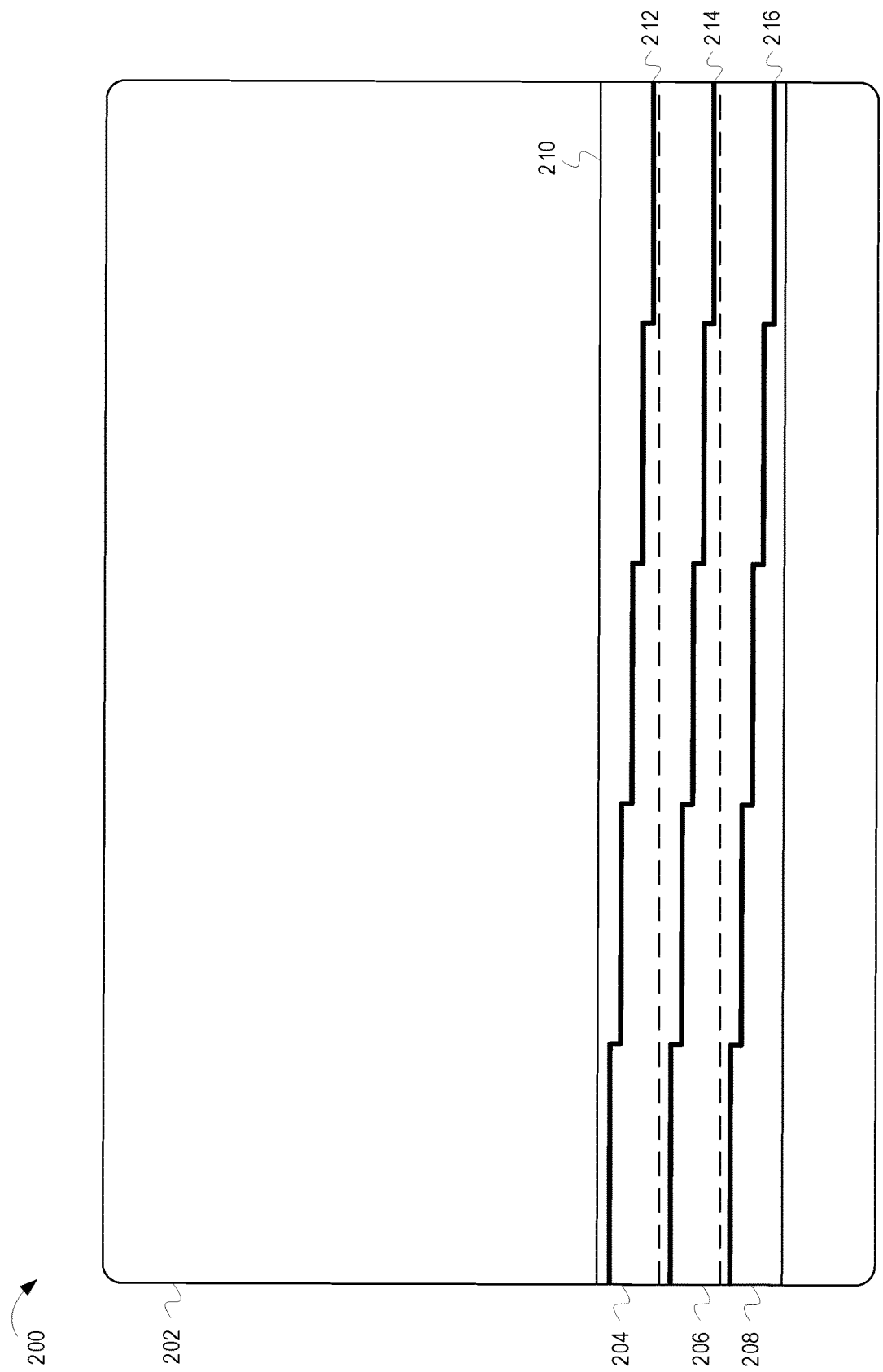
FIG. 2 depicts a test card 200 including a first electrical trace 216, a second electrical trace 214, and a third electrical trace 212, wherein each of the electrical traces forms a stair step configuration, according to some embodiments.

While the discussion of FIG. 1 describes a test card including a single electrical trace in a stair step configuration, the discussion of FIG. 2 describes a test card including multiple electrical traces.

FIG. 2 depicts a test card 200 including a first electrical trace 216, a second electrical trace 214, and a third electrical trace 212, wherein each of the electrical traces forms a stair step configuration, according to some embodiments. The test card comprises a substrate 202 including a magnetic stripe area 210. The magnetic stripe area 210 includes three tracks: a first track 208, a second track 206, and a third track 204. The tracks can be of any suitable size, as described in the aforementioned standards. In a preferred embodiment, the tracks are at least twelve millimeters wide.

The test card 200 depicted in FIG. 2 includes three electrical traces: a first electrical trace 216, a second electrical trace 214, and a third electrical trace 212. Each of the three electrical traces resides within a track. Specifically, the first electrical trace 216 resides within the first track 208, the second electrical trace 214 resides within the second track 206, and the third electrical trace 212 resides within in the third track 204. Although the test card 200 depicted in FIG. 2 includes an electrical trace in each of the three tracks, such a configuration is not required. For example, the test card 200 may include one or two electrical traces, and these electrical traces can reside in any of the three tracks. Each of the three electrical traces forms a stair step configuration. That is, each of the first electrical trace 216, the second electrical trace 214, and the third electrical trace 212 comprises horizontal linear segments and vertical linear segments.

The number, and length, of the horizontal linear segments and the vertical linear segments can be modified to suit specific testing purposes. For example, each vertical linear segment can range in length from 0.1 mm to 6 mm. Additionally, each horizontal linear segment need not be the same length as others of the horizontal linear segments and each vertical linear segment need not be the same length as others of the vertical linear segments. Further, in some embodiments, the test card 200 can include a ground plane between the tracks. The width of the ground plane can be based on the aforementioned standards, or can be varied for testing purposes. In some embodiments, the stair step configuration of the electrical traces allows the width of the ground plane to be minimized, as the corresponding portions of the linear segments remain sufficiently spaced from one another so as to limit, or completely avoid, crosstalk between the electrical traces.

In some embodiments, the test card 200 can include one or more resistors. The resistors act to limit the current draw of the electrical traces. Such current-limiting resistors can prevent or minimize the occurrence of crosstalk between the electrical traces. Additionally, the current-limiting resistors can prevent, or minimize the likelihood of, the test card 200 drawing more current than an automated testing system can provide. The test card 200 can include a single resistor electrically coupled to all of the electrical traces, or a resistor for each of the electrical traces.

Figure 3:
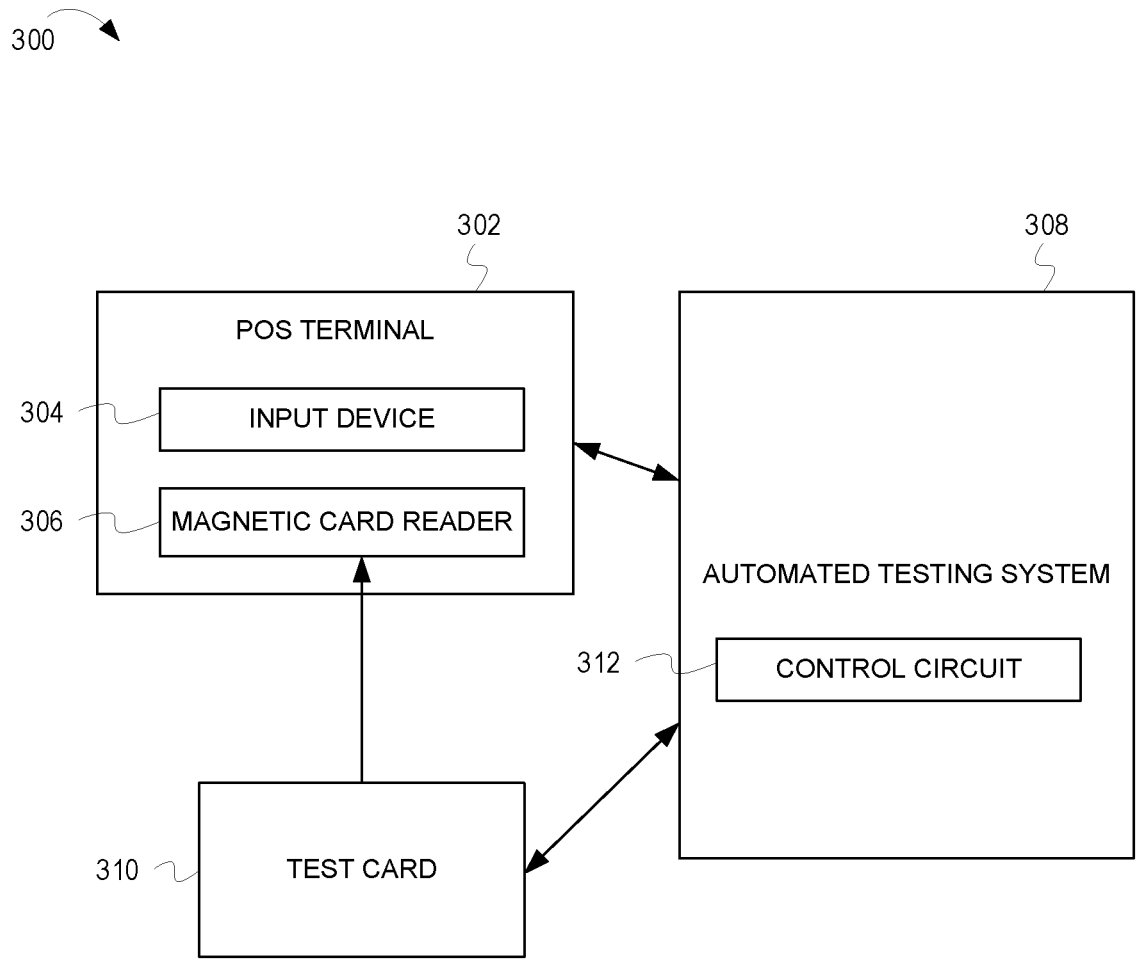
FIG. 3 is a block diagram of a system 300 for use with a test card 310 for automated testing of a point-of-sale (POS) terminal 302, according to some embodiments.

While the discussion of FIG. 2 provides additional detail regarding a test card having electrical traces configured in a stair step configuration, the discussion of FIG. 3 describes using such a test card for automated testing of a point-of-sale (POS) terminal.

FIG. 3 is a block diagram of a system 300 for use with a test card 310 for automated testing of a point-of-sale (POS) terminal 302, according to some embodiments. The system 300 includes the POS terminal 302, an automated testing system 308, and the test card 310. The POS terminal 302 includes an input device 304 (e.g., a keyboard, touchscreen, touchpad, etc.) and a magnetic card reader 306. The automated testing system 308 interacts with the POS terminal 302 via the test card 310 and the magnetic card reader 306. In some embodiments, the automated testing system 308 performs this interaction by swiping the test card 310 through the magnetic card reader 306. In such embodiments, the automated testing system 308 includes a mechanism suitable to manipulate the test card 310 (e.g., a robotic arm). In other embodiments, the test card 310 remains stationary with respect to the magnetic card reader 306 during testing. In such embodiments, the automated testing system 308 can pulse the magnetic stripe data to simulate physical movement of the test card 310 with respect to the magnetic card reader 306.

The automated testing system 308 includes a control circuit 312. The control circuit 312 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 312 is configured (for example, by using corresponding programming as will be well understood by those skilled in the art) to carry out one or more of the steps, actions, and/or functions described herein.

By one optional approach the control circuit 312 operably couples to a memory. The memory may be integral to the control circuit 312 or can be physically discrete (in whole or in part) from the control circuit 312 as desired. This memory can also be local with respect to the control circuit 312 (where, for example, both share a common circuit board, chassis, power supply, and/or housing) or can be partially or wholly remote with respect to the control circuit 312 (where, for example, the memory is physically located in another facility, metropolitan area, or even country as compared to the control circuit 312).

This memory can serve, for example, to non-transitorily store the computer instructions that, when executed by the control circuit 312, cause the control circuit 312 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).

The automated testing system 308, via the control circuit 312, selects a test case to execute. The test case to execute can be selected by any suitable means. For example, the automated testing system 308 can randomly select the test case to execute, or select test cases to execute in a predetermined order. After selecting the test case to execute, the automated testing system 308 selects the magnetic stripe data. The automated testing system selects the magnetic stripe data based on the test case to execute. For example, the test case to execute may call for a type of magnetic stripe card (e.g., a credit card, a debit card, a gift card, etc.), a card provided by a specific issuer (e.g., a specific financial institution), and/or a card provided by a specific company (e.g., a specific credit card company). After selecting the magnetic stripe data, the automated testing system 308 programs the test card 310 with respect to the magnetic stripe data. Once programmed, the automated testing system 308 causes the test card 310 to interact with the POS terminal 302 via the magnetic card reader 306. In some embodiments, the automated testing system 308 can verify that the magnetic card reader 306 read the test card 310 properly and/or that the POS terminally received, and responded to, information transmitted in response to the test card 310 interaction. In such embodiments, the automated testing system 308 can be communicatively coupled to the POS terminal 302. For example, the automated testing system 308 can capture an image of a presentation of a display device associated with the POS terminal 302 and analyze the captured image, as described in U.S. Patent Application No. 62/589,970, filed Nov. 22, 2017, incorporated herein by reference. In such embodiments, the automated test system can analyze the captured image for payment information, or any other information included in the magnetic stripe data.

Figure 4:
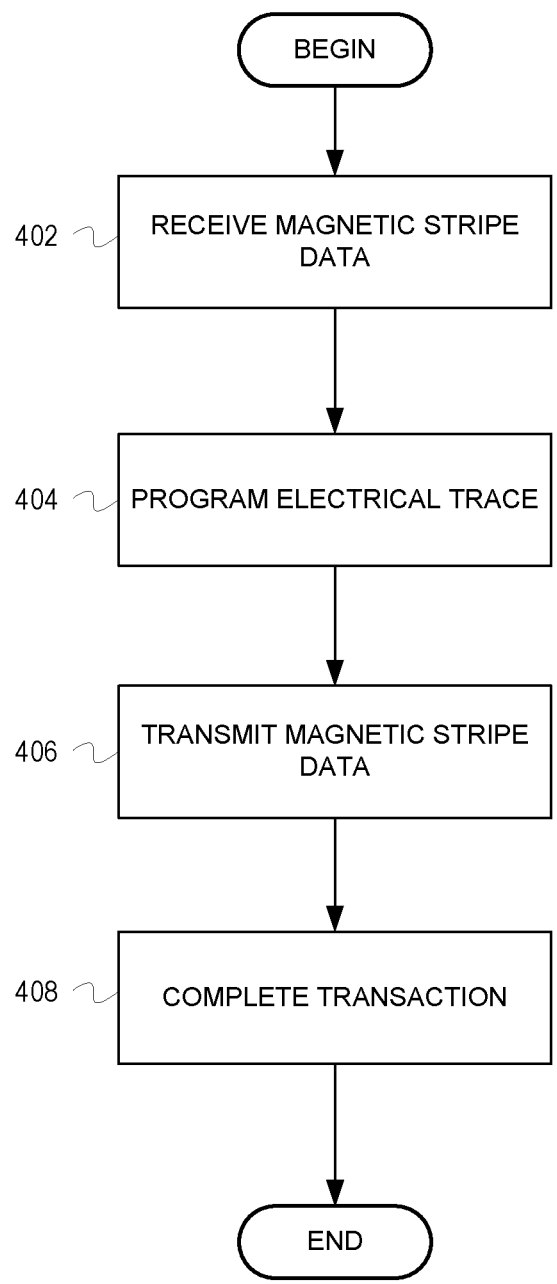
FIG. 4 is a flow chart depicting example operations for using a test card with an automated testing system to test a retail financial transaction for a point-of-sale (POS) terminal, according to some embodiments.

While the discussion of FIG. 3 describes a system using such a test card for automated testing of a point-of-sale (POS) terminal, the discussion of FIG. 4 describes example operations for using a test card with an automated testing system to test a retail financial transaction.

FIG. 4 is a flow chart depicting example operations for using a test card with an automated testing system to test a retail financial transaction for a point-of-sale (POS) terminal, according to some embodiments. The flow begins at block 402.

At block 402, magnetic stripe data is received. For example, a test card can receive the magnetic stripe data from an automated testing system. The magnetic stripe data received is based on a test case to execute. The test case to execute can call for a specific type of card, a card issued by a specific institution, or a card provided by a specific company. The automated testing system selects the magnetic stripe data based on the test case to execute. In some embodiments, the automated testing system accesses a database to retrieve the magnetic stripe data. The database can include magnetic stripe data for a variety of transactions, and the automated testing system retrieves magnetic stripe data appropriate for the test case to be executed. The flow continues at block 404.

At block 404, an electrical trace is programmed. For example, the automated testing system can program an electrical trace of the test card based on the magnetic stripe data. The programming can be constant, in that once programmed, the electrical trace maintains the magnetic stripe data for a period of time in memory, or can be transmitted repetitively, such as in a pulsed manner. In some embodiments, the electrical trace forms a stair step configuration, as described in more detail with respect to FIGS. 1 and 2. The flow continues at block 406.

At block 406, magnetic stripe data is transmitted. For example, the test card can transmit the magnetic stripe data to a POS terminal via a magnetic card reader. The magnetic card reader can obtain the magnetic stripe data via a swipe or simulated swipe. The flow continues at block 408.

At block 408, a transaction is completed. For example, the transaction is completed by the POS terminal using the magnetic stripe data received from the test card. Completing a transaction can refer to purchasing products (for monetary value or with test magnetic stripe data) and/or verifying that the magnetic card reader correctly read the magnetic stripe data from the test card, that the magnetic card reader correctly transmitted the magnetic stripe data to the POS terminal, and/or that the POS terminal correctly responded to the magnetic stripe data.

In some embodiments, the test card comprises a substrate, wherein the substrate includes at least one track, and wherein the substrate is configured to interact with a magnetic card reader, an electrical contact, wherein the electrical contact is configured to receive magnetic stripe data from a database, and an electrical trace, wherein the electrical trace is programmable with respect to the received magnetic stripe data, wherein the electrical trace is positioned within the at least one track and forms a continuous conductive pathway, wherein the electrical trace forms a stair step configuration comprising a plurality of linear segments, wherein the plurality of linear segments includes a first set of linear segments and a second set of linear segments, wherein the second set of linear segments includes at least one segment, and wherein the at least one segment connects ones of the first set of linear segments.

In some embodiments, a system for automated testing of retail financial transactions comprises a point-of-sale terminal, wherein the POS terminal comprises an input device, wherein the input device is configured to receive product information for the POS terminal, and a magnetic card reader, wherein the magnetic card reader is configured to receive payment data for the POS terminal via a test card, an automated testing system, wherein the automated testing system is configured to interact with the magnetic card reader via the test card, and the test card, wherein the test card is configured to receive magnetic stripe data from the system, and wherein the test card comprises an electrical trace, wherein the electrical trace is programmable with respect to the received magnetic stripe data, and wherein the electrical trace forms a stair step configuration comprising horizontal and vertical portions.

In some embodiments, an apparatus and a corresponding method for using a test card with an automated testing system to test a retail financial transaction at a point-of-sale (POS) terminal performed by the apparatus comprises receiving, at the test card from the automated testing system, magnetic stripe data, programming, with respect to the magnetic stripe data, an electrical trace of the test card, wherein the electrical trace forms a stair step configuration comprising horizontal and vertical portions, transmitting, via the electrical trace of the test card, the magnetic stripe data to a magnetic card reader of the POS terminal, and completing a transaction at the POS terminal with the magnetic stripe data.

It should be noted that the operations performed herein can be performed with real magnetic stripe data (i.e., a live card issued by a financial institution or retailer) or test magnetic stripe data (i.e., with a card issued or configured for testing purposes).

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:
1. A test card for use in automated testing of a point-of-sale (POS) terminal, the test card comprising:
   a substrate, wherein the substrate includes at least one track, and wherein the substrate is configured to interact with a magnetic card reader;

an electrical contact, wherein the electrical contact is configured to receive magnetic stripe data from a database; and an electrical trace, wherein the electrical trace is programmable with respect to the received magnetic stripe data, wherein the electrical trace is positioned within the at least one track and forms a continuous conductive pathway, wherein the electrical trace forms a stair step configuration comprising a plurality of linear segments, wherein the plurality of linear segments include a first set of linear segments and a second set of linear segments, wherein the second set of linear segments includes at least one segment, and wherein the at least one segment connects ones of the first set of linear segments.

2. The test card of claim 1, wherein the first set of linear segments are parallel with respect to an edge of the test card and wherein the second set of linear segments are normal to the edge of the test card.

3. The test card of claim 2, wherein the at least one track is twelve millimeters wide, and wherein each segment of the second set of linear segments is at least 0.5 millimeters long.

4. The test card of claim 2, wherein the at least one track is two millimeters wide, wherein the trace includes at least four segments in the second set of linear segments, and wherein the at least four segments in the second set of linear segments is at least 0.4 millimeters long.

5. The test card of claim 1, wherein the test card is configured to be attached to an automated testing system, wherein the automated testing system interacts with the magnetic card reader via the test card.

6. The test card of claim 5, wherein the automated testing system is configured to test retail financial transactions.

7. The test card of claim 1, wherein the magnetic stripe data is for one of a credit card, a debit card, and a gift card.

8. The test card of claim 1, wherein the substrate is a printed circuit board (PCB).

9. The test card of claim 1, the test card further comprising:
a resistor electrically coupled to the electrical trace, wherein the resistor limits current flow through the electrical trace.

10. The test card of claim 1, wherein the substrate is substantially similar in size to a standard credit card.

11. A system for automated testing of retail financial transactions, the system comprising:
a point-of-sale (POS) terminal, wherein the POS terminal comprises:
an input device, wherein the input device is configured to receive product information for the POS terminal; and
a magnetic card reader, wherein the magnetic card reader is configured to receive payment data for the POS terminal via a test card;
an automated testing device, wherein the automated testing device is configured to interact with the magnetic card reader via the test card; and
the test card, wherein the test card is configured to receive magnetic stripe data from the system, and wherein the test card comprises:
an electrical trace, wherein the electrical trace is programmable with respect to the received magnetic stripe data, wherein the electrical trace is positioned within the at least one track, and wherein the electrical trace forms a stair step configuration comprising horizontal and vertical portions.

12. The system of claim 11, wherein the horizontal and vertical portions comprise at least two horizontal portions and at least one vertical portion, and wherein the at least one vertical portion connects the at least two horizontal portions.

13. The system of claim 11, wherein the at least one track is twelve millimeters wide, and wherein the vertical portions are at least 0.5 millimeters long.

14. The system of claim 11, wherein the at least one track is two millimeters wide, wherein the trace includes at least four vertical portions, and wherein the at least four vertical portions are at least 0.4 millimeters long.

15. The system of claim 11, wherein the magnetic stripe data is for one of a credit card, a debit card, and a gift card.

16. The system of claim 11, wherein the test card further comprises:
a resistor electrically coupled to the electrical trace, wherein the resistor limits current flow though the electrical trace.

17. A method for using a test card with an automated testing system to test a retail financial transaction for a point-of-sale terminal, the method comprising:
receiving, at the test card from the automated testing device, magnetic stripe data;
programming, with respect to the magnetic stripe data, an electrical trace of the test card, wherein the electrical trace forms a stair step configuration comprising horizontal and vertical portions;
transmitting, via the electrical trace of the test card, the magnetic stripe data to a magnetic card reader of the POS terminal; and
completing a transaction at the POS terminal with the magnetic stripe data.

18. The method of claim 17, wherein the horizontal and vertical portions comprise at least two horizontal portions and at least one vertical portion, and wherein the at least one vertical portion connects the at least two horizontal portions.

19. The method of claim 17, wherein the at least one track is two millimeters wide, and wherein the vertical portions are at least 0.4 millimeters long.

20. The method of claim 17, wherein the at least one track is two millimeters wide, wherein the trace includes at least four vertical portions, and wherein the at least four vertical portions are at least 0.4 millimeters long.

* * * * *